United States Patent [19]
Medvick

[11] Patent Number: 4,792,162
[45] Date of Patent: Dec. 20, 1988

[54] PROTECTIVE DEVICE FOR QUICK CONNECT COUPLING

[75] Inventor: Richard J. Medvick, Shaker Heights, Ohio

[73] Assignee: Swagelok Quick Connect Co., Hudson, Ohio

[21] Appl. No.: 945,836

[22] Filed: Dec. 23, 1986

[51] Int. Cl.⁴ .............................................. F16L 11/12
[52] U.S. Cl. ...................................... 285/45; 285/316
[58] Field of Search ................................. 285/45, 316; 137/614.04, 614.05

[56] References Cited

U.S. PATENT DOCUMENTS

| | | |
|---|---|---|
| Re. 23,365 | 5/1951 | Stranberg . |
| 947,501 | 1/1910 | Thomes . |
| 2,412,685 | 12/1946 | Hoffman et al. . |
| 2,455,544 | 12/1948 | Yonkers ............................ 285/45 X |
| 2,502,630 | 4/1950 | Morrison . |
| 2,665,926 | 1/1954 | Fraser . |
| 2,948,553 | 10/1960 | Gill et al. . |
| 3,052,488 | 9/1962 | Bruning ............................ 285/45 X |
| 3,097,865 | 7/1963 | Zeeb et al. ....................... 285/45 X |
| 3,167,092 | 1/1965 | Kelly et al. . |
| 3,230,964 | 1/1966 | Debrotnic et al. . |
| 3,258,026 | 6/1966 | Weaver ............................. 285/45 X |
| 3,435,848 | 4/1969 | Johnston . |
| 4,005,735 | 2/1977 | Miyamoto . |
| 4,146,058 | 3/1979 | Bercovitz . |
| 4,378,028 | 3/1983 | Weber et al. ................... 137/614.05 |
| 4,664,420 | 5/1987 | Demeri .......................... 285/316 X |

FOREIGN PATENT DOCUMENTS

| | | |
|---|---|---|
| 2418832 | 10/1975 | Fed. Rep. of Germany . |
| 351101 | 9/1972 | U.S.S.R. ............................. 285/316 |

Primary Examiner—Dave W. Arola
Attorney, Agent, or Firm—Fay, Sharpe, Beall, Fagan, Minnich & McKee

[57] ABSTRACT

A protective device for a quick connect coupling having selectively connectable male and female coupling bodies. The device includes a generally cylindrical sleeve extending axially beyond and radially outward of an end face of one of the male and female coupling bodies. The sleeve has a generally radially outward tapering conformation to add desired rigidity and bulk thereto. The protective device is designed to extend axially outward beyond either the female receiving member or the male stem portion in both a first outermost biased position and a second innermost position.

1 Claim, 3 Drawing Sheets

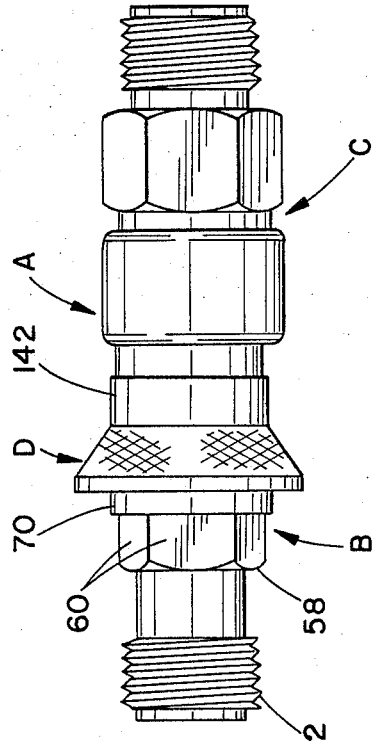
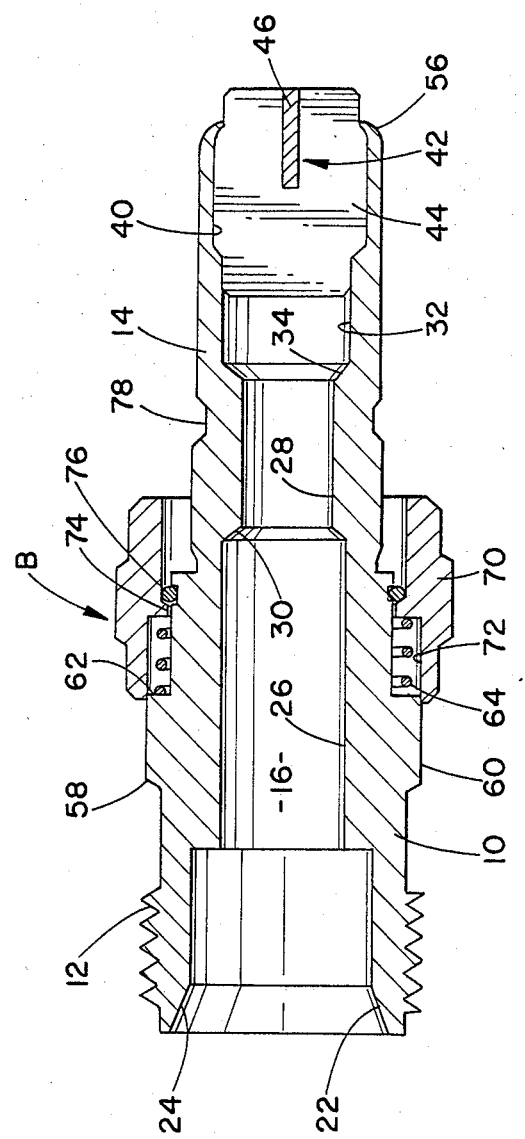

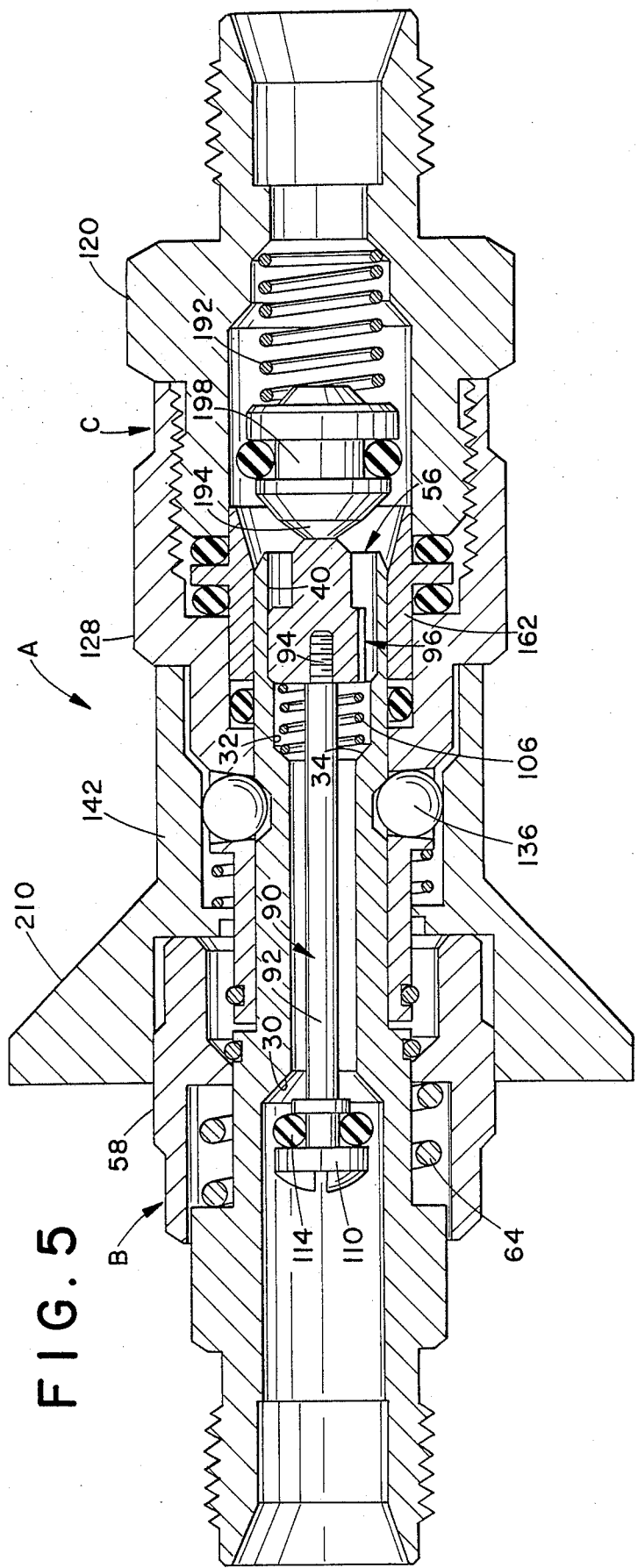
FIG. 5
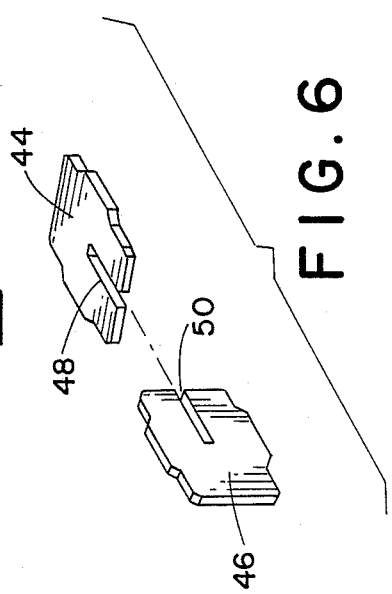
FIG. 6
FIG. 7

PROTECTIVE DEVICE FOR QUICK CONNECT COUPLING

BACKGROUND OF THE INVENTION

This invention pertains to the art of fluid fittings and more particularly to a quick connect type fluid coupling having a male body portion selectively cooperable with a female body portion.

The invention is particularly applicable to use with a female body portion of the foregoing type of fluid coupling and will be described with particular reference thereto. However, it will be appreciated that the invention has broader applications and may be advantageously employed on the male body portion or on both the male and female body portions in other environments and applications.

U.S. Pat. No. 4,378,028, issued Mar. 29, 1983 to Weber, et al., is commonly assigned with the subject application and its teachings are incorporated hereinto by reference. This patent describes in detail a quick connect tube coupling adaptable to either single or double end shut-off applications. The versatility and reliability of that particular quick connect coupling structure has met with substantial commercial success. Nevertheless, a possibility exists that careless handling by an operator or user can result in coupling bodies being marred or disfigured to the point of becoming non-mating with a counterpart coupling body. Such result would occur most often when a coupling body was inadvertantly dropped or otherwise received rough treatment.

Typically, the male and female coupling bodies are advantageously secured to the ends of fluid lines. The opposed, terminal ends of the coupling bodies are adapted to be placed in cooperating, locked relation with each other to permit fluid flow therethrough. Prior to being placed in this cooperative relationship, however, the coupling bodies remain exposed at the end of their associated fluid lines. As previously mentioned, accidental or inadvertant dropping, or other rough handling of a fluid line can result in denting, marring, or disfigurement of the coupling body. This, in turn, can adversely impact the precision fit that can be achieved with an associated coupling body. Indeed, such damage can prevent obtaining a locked relationship between the two coupling components.

Other quick connect coupling arrangements and designs are similarly exposed to the above described type of problem. The axially outward extending male stem and the axially outward extending female receiving member define outermost faces of the coupling bodies. Depending on the coupling design either one or both of the bodies are subject to possible damage as a result of careless handling.

It has been considered desirable to provide a protective device for the separate coupling bodies that limits the potential for the above described type of damage. Additionally, such an arrangement must not interfere with the quick connect or quick disconnect of the separate bodies. The subject application is deemed to meet these needs and others in a manner which successfully overcomes the above-referenced problems.

SUMMARY OF THE INVENTION

In accordance with the present invention a protective device for a quick connect coupling is advantageously provided.

According to one aspect of the invention, the protective device is adapted for use with a quick connect coupling of the type having a hollow stem portion extending from a male body portion and receivable in a female body portion. The female body portion includes a hollow receiving member dimensioned to closely receive the male stem portion, and further has locking means to selectively retain the stem portion therein. The protective device comprises an enlarged flange extending beyond an outermost end face of one of the receiving member and stem portion.

According to a more limited aspect of the invention, the sleeve extends axially beyond and radially outward from an end face of one of the receiving member and stem portion.

In accordance with yet another aspect of the invention, the sleeve has a generally tapering conformation for adding sufficient bulk and rigidity to the structure to withstand impact forces.

In accordance with a still further aspect of the invention, the sleeve includes a bore adapted to accommodate the other of the male and female body portions.

According to another aspect of the invention, the sleeve or flange extends axially beyond the outermost end of one of the receiving member and stem portion in both its inward or recessed locking position or its outward or extended position.

A principal advantage of the invention resides in the protection offered to male and female quick connect coupling bodies.

Yet another advantage of the invention is found in the simplified arrangement and non-interfering relationship with the connecting and disconnecting actions of the coupling bodies.

A still further advantage of the invention is realized in the adaptability of the process to a cost effective method of construction.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 1 is a side elevational view of a quick connect coupling incorporating the protective device of the subject invention;

FIG. 2 is a vertical cross-sectional view of the male body portion used in a single end shut-off type of coupling;

FIG. 5 is vertical cross-sectional view showing a double end shut-off coupling with the male and female body portions in a connected and locked relationship;

FIG. 6 is an exploded perspective view of the valve opening means of the single end shut-off type of coupling; and FIG. 7 is an end view of the guide and support member of the double end shut-off type of coupling.

DETAILED DESCRIPTION OF THE PREFERRED EMBODIMENT

Figure 3:
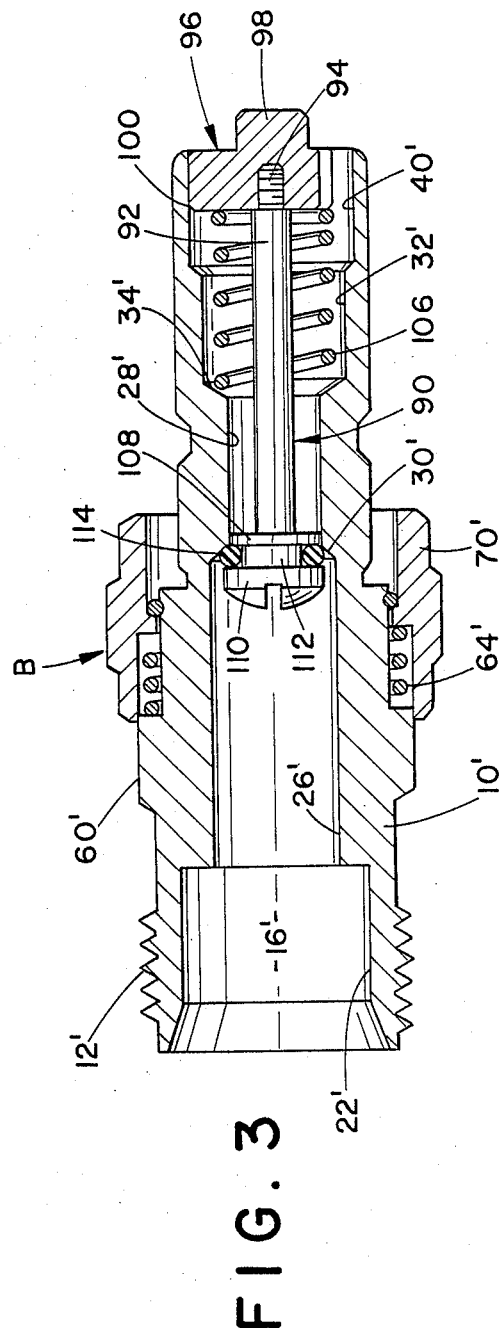
FIG. 3 is a vertical cross-sectional view of a male body portion used in a double end shut-off type of coupling.

Referring now to the drawings wherein the showings are for purposes of illustrating the preferred embodiment of the invention only, and not for purposes of limiting same, FIG. 1 shows a connected and locked quick connect coupling A having a male coupling body B and a female coupling body C.

More particularly, and with additional reference to FIGS. 2 and 3, the male coupling body B includes a generally elongated tubular member 10 having a first exteriorly threaded end 12 and an opposite or second hollow stem portion end 14. The threaded end is adapted for accommodating connection to a fluid system as is well known. Typically, a ferrule and nut assembly are received on the threaded end 12 to securely mount body B to one end of a fluid line or the like. A generally central through passage 16 communicates between the opposed ends of the tubular member and includes distinct, different diameter passage sections, all of which are concentrically arranged in the preferred embodiment.

A first enlarged passage section 22 is interposed between a flared outer end 24 and an intermediate passage section 26. The intermediate passage section merges into reduced diameter passage section 28 along a radially inward tapering shoulder 30. The shoulder provides versatile use of the male coupling body, facilitating changeover between the single end shut-off arrangement (FIG. 2) and the double end shut-off arrangement (FIG. 3). The function of the shoulder and cooperation with the other elements of the quick connect coupling will be described in greater detail below. Another intermediate diameter passage section 32 is provided adjacent the outer end of stem portion 14. The juncture between passage sections 28 and 32 is defined by a generally radially extending shoulder 34 that also facilitates changeover to the double end shut-off arrangement and, likewise, will be described further below. The passage section 32, in turn, communicates with an enlarged bore section 40 at the outer end. The enlarged bore section is adapted to receive a valve opening means 42.

According to the preferred embodiment, the valve opening means 42 comprises first and second interlocking halves 44, 46. Each of the interlocking halves has a generally planar configuration with a central slot 48, 50, respectively, extending along a partial axial length thereof (FIG. 6). The interlocking halves are positioned in mating relationship through interconnection along these slots to define a generally cross-shaped conformation. An outer terminal end 56 of the stem portion has a reduced cross-sectional area for securely retaining the valve opening means 42 in the enlarged bore section.

The outer wall of the elongated tubular member includes an enlarged portion 58 having peripherally spaced wrench flats 60 adapted to facilitate handling of the male coupling body. An external shoulder 62 is defined on one end of the enlarged portion and functions as a stop or limit surface for biasing means such as spring 64. The spring is operatively received in a first sleeve 70 adapted for movement relative to the tubular member 10. One end of the sleeve has an enlarged bore adapted to slide over the enlarged portion 58 of the tubular member. Further, the spring 64 is received in enlarged bore 72 to abuttingly engage an internal rim or shoulder 74. The rim not only functions as a second limit surface for the spring biasing means, but also cooperates with a stop ring 76 on the tubular member to limit movement of the first sleeve 70 toward the stem portion 14. The internal rim selectively abuts the stop ring to define the rightward limit of movement of the first sleeve relative to the tubular member as shown in FIG. 2.

The stem portion 14 extends outwardly from the first sleeve 70 a substantial distance for receipt in the female coupling body C. As will be described further hereinbelow, a peripheral groove 78 facilitates locking engagement between the male and female coupling bodies. Preferably, the peripheral groove has sloping side walls for reasons which will become more apparent after further description of the subject invention.

FIG. 3 shows a male coupling body B' that is virtually identical to that described above in reference to FIG. 2. Additionally, however, the FIG. 3 embodiment is adapted for double end shut-off application. For ease of illustration, like elements are identified by like numerals with a primed (') suffix and new elements are identified by new numerals. The male coupling body incorporates a valve core 90 therein. The valve core includes an elongated rod-like member 92 threaded at one end 94. The threaded end 94 advantageously receives a guide and support member 96. The guide and support member includes an outermost nose portion 98 designed for abutting engagement with a valve member of the female coupling body as will be described below. The guide and support member further includes a plurality of radially extending ribs 100 (FIG. 7) that are closely received in the enlarged bore section 40'. The ribs also define an abutment surface for one end of valve core biasing means, such as spring 106. The opposite end of the spring 106 interfaces with the radially extending shoulder 34' so as to bias the valve core 90 rightwardly as shown in FIG. 3.

The opposed end of the valve core includes a flange 108 dimensioned for close receipt in passage section 28'. An enlarged head 110 is spaced from the flange 108 by a recessed area 112. The recessed area is adapted to receive a seal member such as O-ring 114. In the rightward biased position, the O-ring 114 sealingly engages with the tapering shoulder 30' which defines a valve seat in the double end shut-off arrangement. Thus, the valve core assumes a normally closed relationship with the tubular member and prohibits fluid flow through passage 16'.

Figure 4:
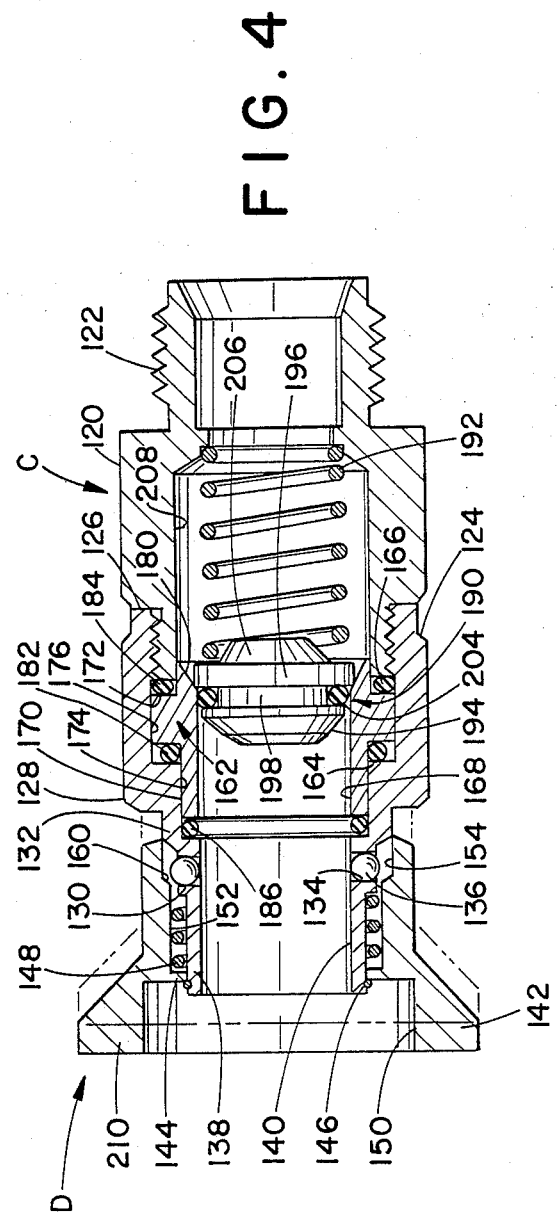
FIG. 4 is a vertical cross-sectional view of the female body portion which incorporates the subject invention thereinto.

With particular reference to FIG. 4, the female coupling body C comprises a hollow tubular member 120 that is exteriorly threaded at one end 122. The threaded end 122 is also adapted to receive an internally threaded coupling nut or the like that cooperates with a ferrule (not shown) for connection to an associated fluid system in much the same manner as the male coupling body. A body member extension 124 is disposed on an exterior threaded portion 126 at the other end of the tubular member 120. The body member extension 124 includes first and second radially extending shoulders 128, 130 disposed on opposite sides of a central portion 132. The central portion includes openings 134 spaced along selected peripheral sections thereof. Locking means, shown as ball detents 136, are received in the circumferentially spaced openings. It will be understood by those skilled in the art, that other locking means such as arcuate locking dogs and the like may be used as an alternative to the ball detents 36 without departing from the scope and intent of the subject invention.

The end of the body member extension remotely disposed from the tubular member defines the receiving member 138 of the female coupling body C. The receiving member has an interior passage 140 dimensioned to closely receive the outer surface of male stem portion 14. Close tolerances must be maintained so that the locking means will securely retain the male stem portion when desired.

A locking/releasing sleeve 142 is slidably received over the central portion 132 and receiving member 138. The sleeve 142 includes a radially inward extending flange 144 adapted for selective abutting engagement with a stop ring 146 disposed on the receiving member. Biasing means such as spring 148 is axially disposed between the radial flange 144 and radial shoulder 130 of the body member extension. The spring biases the locking/releasing sleeve to an axial outer position, i.e. to the left, as illustrated in FIG. 4.

The locking/releasing sleeve includes three distinct bore sections 150, 152, 154. More particularly, the first or enlarged bore section 150 is dimensioned to freely receive a portion of the first sleeve 70 of the male coupling body (FIG. 5). The second bore section 152 is adapted to receive the spring 148 while the third bore section 154 accommodates the central portion 132 of the body member extension. In this manner, the locking/releasing sleeve 142 is adapted for axial movement relative to the body member extension upon imposition of sufficient axial force to overcome the outward biasing force of spring 148.

Still further, a tapering camming surface 160 is interposed between the second and third bore sections, and selectively cooperates with the locking means 136. As shown in FIG. 4, the release position of the locking/releasing sleeve permits the locking means 136 to move radially outward into third bore section 154 of the sleeve. Axial movement of the sleeve 142 relative to the body member extension and against the opposed biasing force of spring 148 cams the locking means 136 radially inward due to abutting engagement with the the camming surface 160 (FIG. 5). Outward radial movement of the locking means is thereafter constrained due to the reduced dimension of the second bore section 152. Thus, the locking means 136 are positioned radially inward into their receiving openings 134 and engage the peripheral groove 78 on the male stem portion, thus preventing axial removal of the stem portion from the female coupling body. Maintaining the locking/releasing sleeve in its rightward position illustrated in phantom in FIG. 4, and also shown in FIG. 5, lockingly joins the male coupling body B to the female coupling body C. The biasing force of spring 64 is substantially larger than the biasing force of spring 148. Due to this force relationship, the first sleeve 70 of the male coupling body will maintain rightward engagement with stop ring 76 during axial insertion of the stem portion into the receiving member. On the other hand, the locking/releasing sleeve 142 will be positioned away from engagement with stop ring 146 and the spring 148 will be further compressed. This movement of the sleeve 142, in turn, cams the locking means into retaining engagement with peripheral groove 78 which is maintained until the flange 144 is again abutting stop ring 146.

Turning again to details of the female coupling body C, a generally cylindrical valve seat member 162 is interposed between interior shoulders 164 of the body member extension and end shoulder 166 of the tubular member 120. The valve seat member includes an interior passage 168 also adapted to closely receive the male stem portion 14 once it is inserted into the receiving member 138. The valve seat member is of a generally stepped configuration having first and second cylindrical portions 170, 172 received in bores 174, 176, respectively, of the body member extension. A tapered seat area 180 extends axially and radially outward from the interior passage 168 at one end of the valve seat member. Further, first and second seal members such as O-rings 182, 184 are disposed on opposite ends of the second cylindrical portion 172. The first and second O-rings prohibit fluid flow around the valve seat member. A third O-ring 186 is captured between the forward end face of seat member 162 and a flange or shoulder area on body extension 124. As is apparent in FIG. 5, this third O-ring is radially compressed upon insertion of the male stem portion into the female coupling body and inhibits fluid flow along the closely toleranced interface area of the stem portion and receiving member.

A generally cylindrical valve member 190 is normally biased into closed relation with valve seat member 162 by spring 192. A generally tapered forward portion 194 of the valve member has a maximum radial dimension permitting receipt in the passage 168 of the valve seat member. On the other hand, an enlarged flange 196 is spaced from the forward portion 194 by a recess or groove 198 and the flange has a radial dimension slightly larger than that of passage 168. The groove is adapted to receive an O-ring 204 therein. The O-ring, of course, provides abutting sealing engagement with the tapered seat area 180 in its normally closed position (FIG. 4) and is spaced therefrom in an open position (FIG. 5). An axial protrusion 206 extends from the flange 196 to retain and center one end of the spring 192 thereon. An opposite end of the spring engages a reduced shoulder area of passage 208 of the hollow tubular member.

Insertion of the male stem portion into locking engagement with the receiving member defines a continuous flow path for fluid in the associated system. Typically, in the single end shut-off arrangement of FIG. 2, only the fluid line associated with the female coupling body is pressurized. Therefore, the male coupling body requires only the valve opening means 42 to engage and unseat valve member 190 of the female coupling body. In other arrangements, the fluid line associated with the male coupling body is also pressurized, thus necessitating use of valve core 90, particularly nose portion 98, to unseat the valve member 190 of the female coupling body.

As previously described above, prior arrangements have been constructed so that the male stem portion extends axially outward from the first sleeve 70. The stem portion is thereby exposed to potential damage, marring, etc. of its surface so that close receipt within the receiving member 124 may not be possible. Likewise, the female receiving member has previously been constructed to extend axially outward from the locking/releasing sleeve. It, too, is exposed to potential damage that would interfere with a close fitting, connected and locked relationship between the male and female coupling bodies.

The protective device D for the female coupling body is defined by an enlarged flange 210 formed on the axial outer end of the locking/releasing sleeve 142. Preferably, the flange tapers both radially and axially outward from a generally cylindrical portion of the sleeve. The tapering configuration provides benefits which are twofold. First, the axial outer end of the sleeve has sufficient bulk and rigidity to withstand significant impact forces which may inadvertently be imposed thereon. Secondly, the enlarged flange permits formation of the first bore section 150 therein to accommodate receipt of the first sleeve 70 of the male coupling body. Thus, no interference with the engagement between the coupling bodies occurs and, as will become more apparent below, disengagement or disconnection of the locked coupling bodies is also unaffected.

As clearly illustrated in FIG. 4, the outwardly biased position of the sleeve and flange 210 extends beyond an outermost face of the receiving member 138. Additionally, when the spring 148 is placed under compression, the enlarged flange 210 still extends beyond the outermost face of the receiving member. Thus, under no circumstances does the receiving member extend axially outward beyond the enlarged flange 210.

Since the flange is formed as an integral extension of the locking/releasing sleeve, the configuration lends itself to manufacture through conventional machining techniques or to formation through powder metallurgy processes. This later process offers significantly reduced manufacturing costs while providing a durable structure.

Although the protective device is illustrated and described with reference to the female coupling body C, it is apparent to those of ordinary skill in the art that a like protective device could be provided on the male coupling body B. For example, one such structure would provide a generally cylindrical sleeve extending radially outward from first sleeve 70 and axially outward toward the stem portion 14. This type of protective device would, of course, have to accommodate a locking/release sleeve of a female coupling body, with or without a protection flange 210.

In the fully joined and locked position shown in FIG. 5, the biasing force of spring 64 is greater than that of spring 148. Thus, the locking/release sleeve is moved axially inward and the locking means 136 engage the peripheral groove 78 of the male stem portion as described above. To disconnect the joined coupling bodies, either the first sleeve 70 or the locking/release sleeve 142 can be moved leftwardly as illustrated in FIG. 5. In either situation, the force of spring 64 is overcome so that the locking/release sleeve 142 abuts stop ring 146 thereby releasing the locking means 136 from engagement in the peripheral groove of the male stem portion. Thus, incorporation of a protective sleeve device is easily accommodated into either a male coupling body or a female coupling body since the connected bodies can be released by either the sleeve 70 or sleeve 142 of the female coupling body. If a protective device is provided for both coupling bodies, the protective flange of the male coupling body would preferably surround the protective flange of the female coupling body. Of course, still other arrangements can be used with equal success.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A protective device for a quick connect coupling of the type including a male body portion having a stem portion and a first sleeve at one end thereof, a female body portion having a receiving member dimensioned to closely receive the male stem portion and means for selectively locking the male stem portion therein, the protective device comprising:

a movable releasing sleeve disposed at one end of said female body portion, said releasing sleeve being spring biased axially toward a first axial position, said first position retaining the male stem portion in the receiving member, said releasing sleeve being shiftable toward a second axial position releasing the male stem portion from the receiving member; and, a generally rigid flange defined on an axially outermost end of said releasing sleeve and movable therewith, said flange having a generally radially outward tapering conformation for adding rigidity and bulk thereto, said flange including an axially inward extending recess area adapted to closely receive the first sleeve of the male body portion therein, and said flange extending axially beyond and radially outward from an outermost end of said receiving member in both of said releasing sleeve first and second axial positions.

* * * * *